United States Patent [19]

Schmuck et al.

[11] Patent Number: 5,196,054

[45] Date of Patent: Mar. 23, 1993

[54] PREPARATION FOR THE WATER-REPELLANT IMPREGNATION OF POROUS, MINERAL BUILDING MATERIALS

[75] Inventors: Manfred Schmuck; Heribert Seyffert, both of Essen, Fed. Rep. of Germany

[73] Assignee: Th. Goldschmidt AG, Essen, Fed. Rep. of Germany

[21] Appl. No.: 751,292

[22] Filed: Aug. 28, 1991

[30] Foreign Application Priority Data

Sep. 19, 1990 [DE] Fed. Rep. of Germany ....... 4029640

[51] Int. Cl.$^5$ .......................... C04B 41/64; C09C 3/18
[52] U.S. Cl. .................................. 106/2; 106/287.11; 106/287.12; 106/287.14; 106/287.16; 427/387
[58] Field of Search ................. 106/2, 287.11, 287.12, 106/287.14, 287.16; 427/387

[56] References Cited

U.S. PATENT DOCUMENTS 4,406,738  9/1983  Fink et al. ............................ 162/124
4,648,904  3/1987  De Pasquale et al. .................. 106/2

FOREIGN PATENT DOCUMENTS 0234024  9/1987  European Pat. Off. .
3312911  10/1984  Fed. Rep. of Germany .
3627060  7/1987  Fed. Rep. of Germany .
3911479  10/1990  Fed. Rep. of Germany .

Primary Examiner—William R. Dixon, Jr.
Assistant Examiner—Margaret V. Einsmann
Attorney, Agent, or Firm—Anderson Kill Olick & Oshinsky

[57] ABSTRACT

A preparation for the water-repellant impregnation of porous, mineral building materials on the basis of organosilicon compounds is disclosed. The preparation is an emulsion containing alkoxy groups and consist of an emulsion containing a) 5 to 45% by weight of an alkoxysilane of the general formula $$R^1-Si-(OR^2)_3$$

wherein $R^1$ is an alkyl group with 1 to 16 carbon atoms and $R^2$ is an alkyl group with 1 to 4 carbon atoms, b) 45 to 5% by weight of a mixture consisting of b1) a silane of the general formula $R^3-Si-(OR^2)_3$, wherein $R_3$ is an aminoalkyl group with 1 to 6 carbon atoms or a group of the general formula $$H_2N-(CH_2)_x R^4-(CH_2)_y-,$$

in which
$R^4$ represents oxygen, sulfur, —NH— or —NH—CH$_2$—CH$_2$—NH group and $x \geq 2$ and $y \geq$, or a group of the general formula $(R^2O)_3Si-(CH_2)_x-NH-(CH_2)_x-$, in which $R^2$ and $x$ are defined as above,

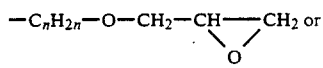

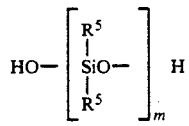

and n is a whole number from 1 to 5, and b2) a polysiloxane of the general formula

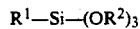

wherein $R^5$ is a methyl or phenyl group, with the proviso that at least 90% of the $R^5$ groups are methyl group and m=20 to 250, the ratio of b1) to b2) being such that more than 1 and up to 3 $OR^2$ groups of compound b1) corresponds to one SiOH group of compound b2), c) between about 0.5 to 10% by weight of an O/W emulsifier or emulsifier mixture and d) about between 40 to 49.5% by weight of water.

The preparations have a high depth of penetration and produce an excellent water-repellent effect.

A method of impregnating building materials in a water repellent manner is also disclosed.

11 Claims, No Drawings

PREPARATION FOR THE WATER-REPELLANT IMPREGNATION OF POROUS, MINERAL BUILDING MATERIALS

FIELD OF INVENTION

The invention relates to a preparation for the water-repellant impregnation of porous, mineral building materials based on organosilicon compounds containing alkoxy groups.

BACKGROUND INFORMATION AND PRIOR ART

Organosilanes or organosiloxanes have been used for many years to impregnate porous, mineral building materials, in order to protect these against penetration by water. It is particularly important for this hydrophobizing treatment that the active ingredients penetrate deeply into the building material and combine chemically or physically with it.

Penetration into the building material is favored if compounds with the lowest possible molecular weight are used as active, organosilicon ingredients. The depth of penetration can be improved additionally by also using organic solvents, which evaporate after use. High reactivity is attained if, as organosilicon compounds, organoalkoxysilanes and/or organoalkoxysiloxanes are used, which can condense in the presence of moisture and react with the building material. During such a reaction, the alcohol, corresponding to the alkoxy group, is split off and evaporated into the atmosphere.

Such a preparation is known from the German patent 33 12 911. It contains organoalkoxysiloxanes of the general formula

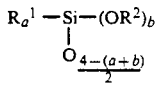

wherein
- $R^1$ is an alkyl or aryl group,
- $R^2$ is an alkyl group with 1 to 4 carbon atoms,
- $a = 0.8$ to 1.5 and
- $b \leq 2$.

This preparation is characterized in that it consists of
(a) 1 to 20% by weight of a mixture of organoalkoxysiloxanes of the aforementioned formula, which consists of 25 to 75% by weight of a siloxane, in which $b = 0.1$ to 0.5 and 75 to 25% by weight of a siloxane, in which $b = 0.8$ to 2.0, $a + b$ being $\leq 3$,
(b) 80 to 99% by weight of a water-immiscible solvent and
(c) optionally, known condensation catalysts.

The essential characteristic of this preparation accordingly consists of carrying out the impregnation not with an organoalkoxysiloxane, the molecular weight distribution of which has only a single maximum, but with a mixture of organoalkoxysiloxanes, the distinguishing feature of which is the different degrees of condensation. By these means, a great depth of penetration, associated with a high effectiveness, particularly on alkaline building materials and a good, optically visible water beading effect are assured.

The preparations described in the German patent 33 12 911 have proven their value in practice. An improvement in these preparations is possible essentially only with respect to the depth of penetration achievable in practice. This depth of penetration is affected essentially by three factors, namely the solvent used, the porosity of the building materials and the care, with which this preparation is applied in practice. Improved impregnating preparations must therefore be rated particularly on the basis of their penetration behavior.

As a result of greater environmental consciousness, the use of organic solvents is increasingly considered to be unacceptable. Special efforts have therefore been made to develop comparable preparations on an aqueous basis.

Further development work has led to a method, which is the object of the German patent 36 27 060. This patent relates to a method for impregnating mineral building materials, particularly masonry, with aqueous solutions of silanols and/or siloxanols, which are synthesized at the site of their use by hydrolysis of alkoxysilanes and/or alkoxysiloxanes. As alkoxysilanes and/or alkoxysiloxanes, compounds of the general formula

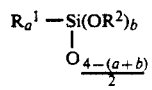

wherein
- $R^1$ is an alkyl group with 1 to 8 carbon atoms, at least 90% of the $R^1$ groups in the average molecule being alkyl groups with 1 to 4 carbon atoms,
- $R^2$ is methyl or ethyl,
- $a = u$ to 1.5
- $b = 1.0$ to 4.0
- $a + b = 2.0$ to 4.0 are selected. These compounds are hydrolyzed continuously in an amount corresponding to their use. The solution obtained is then, after mixing the reactants, applied on the mineral building material within a period of 3 to 30 minutes.

With this procedure, a high penetration of the aqueous preparations into the mineral building materials is achieved. This penetration is comparable with that achieved when solvent-containing preparations are used.

Because of their instability, these aqueous solutions must, as is required in the German patent 36 27 060, be synthesized at the location where they are to be used.

For the purpose of hydrophobizing ceramic materials, published European patent application 02 34 024 discloses an aqueous silane emulsion, which consists essentially of
(a) 1 to 40% by weight of a hydrolyzable silane with a molecular weight of up to about 500 and the general formula $R_nSi(R')_{4-n}$, wherein R is an optionally halogenated hydrocarbon group with 1 to 20 carbon atoms, R' is an alkoxy group with 1 to 3 carbon atoms or a halogen, amino or carboxyl group, $n = 1$ or 2, or oligomers of these silanes and
(b) 0.5 to 50% by weight based on the silane, of an emulsifier with an HLB value of 4 to 15 and
(c) water.

Octyltriethoxysilane is named as a particularly preferred silane. In actual fact, emulsions of such silanes, in which the R group has more than 6 carbon atoms, have a better stability, since the rate of hydrolysis of these reactive silanes is decreased It is, however, a disadvantage that the hydrolysis of these silanes in the building material also necessarily takes place correspondingly slowly and must be catalyzed in a suitable manner. In some building materials, such as fresh concrete, this is possible due to the high alkalinity of this material. In neutral or weakly alkaline building materials, such as calcined clinker and numerous natural stones, this is not possible. Without such a catalysis, however, there is no anchoring of the silanes at the surface of the building material. The silanes can evaporate from the surface or be removed mechanically. This leads to a depletion of silane at the surface and, with that, to a reduced hydrophobization. As a consequence, the water-beading effect is weak or not present at all. The water absorption capacity in the depleted surface layer is high, so that especially this layer, which is particularly exposed to weathering and mechanical attack, is insufficiently protected. These preparations accordingly can be used only with certain building materials.

An impregnating emulsion with a good effect on alkaline and neutral building materials is described in the German Offenlegungsschrift 39 11 479. It contains 2.5 to 25% by weight of an alkoxysilane of the general formula $$R^1-Si(OR^2)_3 \qquad \text{I}$$

wherein
$R^1$ is an alkyl group with 3 to 12 carbon atoms and $R^2$ a methyl or ethyl group;
2 to 20% by weight of an alkoxysiloxane of the general formula $$R^3_a-Si(OR^2)_b \atop O_{\frac{4-(a+b)}{2}} \qquad \text{II}$$

wherein
$R^3$ is an alkyl group with 1 to 6 carbon atoms,
$a = 0.8$ to 1.2 and
$b = 0.2$ to 1.2;
0.01 to 5% by weight of an emulsifier;
0.01 to 0.1% by weight of fillers with an effective surface area of at least 40 m²/g; and
49.9 to 95.48% by weight of water.

This impregnating emulsion generally has good water-repellent and beading effects on alkaline as well as on neutral mineral substrates. If the effects achieved with this emulsion are graded according to the procedure given below, it turns out that the best results are achieved
(a) if the emulsifier content is low, and
(b) the emulsion contains hydrophobic silica and
(c) a curing catalyst for the organosilicon compounds.

At a low emulsifier content, however, the impregnating emulsin is stable for only a limited time. If hydrophobic silica is contained in the emulsion, it frequently settles out on storage, making careful stirring at the site of use, that is, at the building site, necessary. Sufficient care is not always taken. Finally, the curing catalyst limits the time available for processing the emulsion and can lead to premature curing of the active ingredient of the emulsion during storage.

OBJECT OF THE INVENTION

The present invention is concerned with the problem of improving the application properties of such impregnating emulsions and particularly with the problem of producing emulsions, which have a long shelf life and lead to a high water-repellent or beading effect within a short time, as a rule, within a day, without requiring the addition of hydrophobic silica or special curing catalysts. The water-repellent effect should attain a value of 1 or at least of 1 to 2, if it is determined in the following manner.

Tap water (1 mL) is placed with a pipette on the horizontal test surface of a mineral substrate, which has been treated with the impregnating emulsion. After 10 minutes, the water still standing on the surface is shaken off and the contact area of the water droplet is evaluated optically. A grade of:

1 means that there is no wetting of the contact surface;
2 means that 50% of the contact area has been wetted;
3 means that 100% of the contact area has been wetted;
4 means water has been partly absorbed; the contact area is slightly dark;
5 means that at least 50% of the water has been absorbed; the contact area is darker;
6 means that the drop has been absorbed completely; the contact area is quite dark; and
7 means that the drop of water has been absorbed completely in less than 5 minutes.

SUMMARY OF THE INVENTION

The inventive preparation comprises an emulsion which contains
a) 5 to 45% by weight of an alkoxysilane of the general formula $$R^1-Si-(OR^2)_3$$

wherein
$R^1$ is an alkyl group with 1 to 16 carbon atoms and
$R^2$ is an alkyl group with 1 to 4 carbon atoms,
b) 45 to 5% by weight of a mixture consisting of a
b1) silane of the general formula $$R^3-Si-(OR^2)_3$$

wherein
$R^2$ has the meaning already given and
$R^3$ is an aminoalkyl group with 1 to 6 carbon atoms or a group of the general formula $$H_2N-(CH_2)_xR^4-(CH_2)_y-, \text{ in which}$$

$R^4$ represents an oxygen, sulfur, —NH— or —NH—CH$_2$—CH$_2$—NH group and
$x \geq 2$ and
$y \geq 2$, or
a group of the general formula $$(R^2O)_3Si-(CH_2)_x-NH-(CH_2)_x-,$$

wherein $R^2$ and x are defined as above

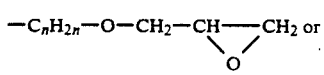

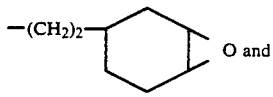

n is a whole number from 1 to 5, and b2) is a polysiloxane of the general formula

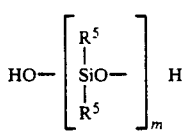

wherein
R$^5$ is a methyl or phenyl group, with the proviso that at least 90% of the R$^5$ groups are methyl group and
m=20 to 250,
the ratio of b1) to b2) being such that more than 1 and up to 3 OR$^2$ groups of compound b1) correspond to one SiOH group of compound b2),
c) 0.5 to 10% by weight of an O/W emulsifier or emulsifier mixture; and
d) 40 to 49.5% by weight of water.

Component a) is an alkoxysilane of the general formula R$^1$-Si-(OR$^2$)$_3$. In this formula, R$^1$ is an alkyl group with 1 to 16 carbon atoms. The alkyl group can be linear or branched. A linear alkyl group is preferred. Examples of suitable alkyl groups are the methyl, ethyl, butyl, i-butyl, hexyl, octyl, decyl, dodecyl and hexadecyl group.

R$^2$ is an alkyl group with 1 to 4 carbon atoms. Examples of the R$^2$ group are the methyl, ethyl, propyl and butyl groups. The methyl and ethyl groups are preferred.

Component b1) is an alkoxysilane of the general formula R$^3$—Si—(OR$^2$)$_3$. Whereas the R$^2$ group has the already given meaning, the R$^3$ group is characterized in that is has a reactive group and is linked over a carbon to the silicon atom. R$^3$ can have the following meaning here:

(1) R$^3$ is an aminoalkyl group, the alkyl group of which has 1 to 6 carbon atoms. Examples of such groups are the ethylamine, propylamine, butylamine and hexylamine groups, the —(CH$_2$)$_3$—NH$_2$ and

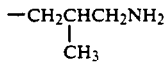

groups being preferred.
(2) R$^3$ is a group of the general formula H$_2$N—(CH$_2$)$_x$R$^4$—(CH$_2$)$_y$—, in which R$^4$ represents an oxygen, sulfur, —NH— or —NH—CH$_2$—CH$_2$—NH group and x≧2 and y=2. Examples of such groups are H$_2$N—(CH$_2$)$_3$— and H$_2$N—(CH$_2$)$_2$—NH—(CH$_2$)$_3$—.
(3) (R$^2$O)$_3$Si—(CH$_2$)$_x$—NH—(CH$_2$)$_x$—. Examples of such groups are (C$_2$H$_5$O)$_3$Si—(CH$_2$)$_3$—NH—(CH$_2$)$_3$— and (CH$_3$)$_3$Si—(CH$_2$)$_2$—NH—(CH$_2$)$_2$—.
(4) R$^3$ is a group of the general formula

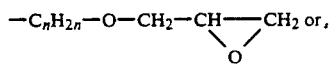

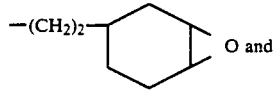

n is a whole umber from 1 to 5. An example of a particularly preferred epoxide is

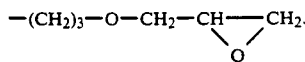

As R$^3$ groups, —(CH$_2$)$_3$—NH$_2$, —(CH$_2$)$_2$—NH—(CH$_2$)$_3$—NH$_2$ and (4) are particularly preferred. Component b2) is an α,Ω-siloxanol of the general formula

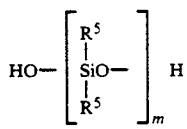

in which R$^5$ is a methyl or phenyl group. At least 90% of the R$^5$ groups must be methyl groups. Particularly preferred are α,Ω-dimethylsiloxanols. m has a value of 20 to 250 and preferably a value of 30 to 80.

The ratio of component b1) to component b2) is to be adjusted, so that more than 1 and up to 3 OR$^2$ groups of compound b1) correspond to one SiOH group of compound b2). Preferably, the ratio of OH:OR$^2$ is 1:2.

Component (c) is an O/W emulsifier or a mixture of such emulsifiers. In general, nonionic emulsifiers are used as emulsifiers, that is, products of the addition reaction between alkylene oxides, preferably ethylene oxide, and compounds with active hydrogen, such as fatty alcohols, and alkyl phenols, such as octylphenol, nonylphenol or dodecylphenol. The content of oxyethylene units should be high enough, so that the HLB value of the emulsifiers is between 6 and 20 and particularly between 10 and 18.

However the anionic or cationic emulsifiers, known from the state of the art, can also be used. Optionally they are mixed with nonionic emulsifiers. The percent by weight composition of the emulsion preferably is:
20 to 30% by weight of component a).
30 to 20% by weight of component b1)+b2) in the ratio of 4:3
3 to 7% by weight of emulsifier
47 to 43% by weight of water.

The inventive emulsion can be prepared by emulsifying components a), b1) and b2) separately or by emulsifying a mixture of the components together. The emulsifier is advantageously added to the component (or to the mixture of the components), which is to be emulsified and the emulsifier-containing mixture is heated, if necessary. The water is then added to this mixture while stirring well. The emulsion, which is formed or has formed, can be homogenized by means of a suitable stirring apparatus, which preferably operates according to the rotor/stator principle. Colloid mills can also be used to reduce the particle size of the emulsified phase.

A modification of the preparation of the present invention is characterized in that components b1) and b2) are not contained individually, but are contained as a reaction product, which is obtained by reacting components b1) and b2) with one another, partially or completely, taking into consideration the stoichiometric ratios, by heating to 150° to 200° C. before the emulsification. It has been observed that good results with respect to the water-repellent effect are also achieved when such a modified inventive preparation is used.

An optimum in the depth of penetration of the impregnating agent, in the water-repelling effect and in the reduction of the soilability of the treated building materials is achieved in accordance with a particularly preferred variation of the invention by replacing the up to 50% by weight of component b) with an equal amount of a siloxane of the general formula

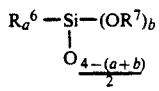

wherein $R^6$ is an alkyl group with 1 to 8 carbon atoms or a phenyl group and
$R^7$ is an alkyl group with 1 to 4 carbon atoms
a=0.8 to 1.2 and
b=0.2 to 1.2.

According to the definition, the siloxane is a siloxane resin, which cures under the action of moisture from the air. Preferably, $R^6$ is a linear alkyl group with 1 to 8 carbon atoms and, in particular, it is a methyl, ethyl, butyl, hexyl or octyl group. $R^6$ can also be a phenyl group. Within the polymeric molecule, $R^6$ can be the same or different. $R^7$ preferably is a methyl or ethyl group.

The inventive preparations satisfy the requirements initially set with respect to improved stability and improved water repellency. The production of the inventive emulsions is described in greater detail in the following examples, it being understood that these examples are given by way of illustration and not by way of limitation. In addition, the application properties of the inventive emulsions are compared with those of preparations of the state of the art.

EXAMPLE 1

γ-Aminopropyltriethoxysilane (6.86 g) is mixed with 93.14 g of a polysiloxane diol with a molecular weight of 4,000. The molar ratio of the polysiloxane diol to the aminoalkylsilane is 3:4. Octyltriethoxysilane (150 g) is added to the mixture.

A 6:4 mixture by weight of emulsifiers (25 g), consisting of an ethoxylated triglyceride with an HLB value of 18 and an ethoxylated fatty alcohol with an HLB value of 11 is dissolved in 225 g of water. The silane/siloxane mixture is stirred into the solution and processed into a stable emulsion by means of a homogenizer (slit homogenizer).

EXAMPLE 2

A mixture of 100 g of a polysiloxane diol with a molecular weight of 6803 and 32.5 g of γ-aminotriethoxysilane is heated with stirring to 180° C. while nitrogen is being passed through it and held for about 4 hours at this temperature, until 8.8 g of ethanol have been driven off. The resulting product subsequently is cooled.

This product (125 g) is mixed with 125 g of isobutyltrimethoxysilane. The preparation is mixed with 20 g of a 1:1 mixture by weight of emulsifiers, consisting of an ethoxylated alkylphenol and a methylpolyoxyethylene(15)-cocoammonium chloride and, after the addition of 355 g of water, processed into an emulsion with equipment operating according to the rotor/stator principle.

EXAMPLE 3

A polysiloxane diol (3,200 g), with a molecular weight of 10,666 and 94.4 g of 3-glycidyloxypropyltrimethoxysilane are mixed with one another. This mixture is heated to 170° C. with stirring and while passing in nitrogen. After about 5 hours, 11.5 g of methanol have been driven off. The resulting reaction product is then cooled.

A 3:7 mixture (by weight) of emulsifier (25 g), consisting of an ethoxylate fatty alcohol and an alkylarylsulfonate is dissolved in 225 g of water. This solution is mixed with 140 g of the reaction product obtained above and 110 g of n-propyltriethoxysilane. The coarse emulsion obtained is pumped three times through a slit homogenizer. A stable emulsion is formed.

EXAMPLE 4

γ-Aminopropyltriethoxysilane (5.15 g) is mixed with 69.85 g of a polysiloxane diol with a molecular weight of 4,000 and 25 g of a siloxane of the general formula

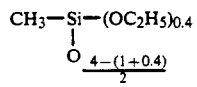

Octyltriethoxysilane (150 g) is added to the mixture.

A 6:4 mixture (by weight) of emulsifier (25 g), consisting of a triglyceride with an HLB value of 18 and an ethoxylated fatty alcohol with an HLB value of 11, is dissolved in 225 g of water. The solution is stirred into the silane/siloxane mixture and processed with a homogenizer (slit homogenizer) to a stable emulsion.

EXAMPLE 5

γ-Aminopropyltriethoxysilane (3.43 g) is mixed with 46.57 g of a polysiloxane diol with a molecular weight of 4,000 and 50 g of a siloxane of the general formula

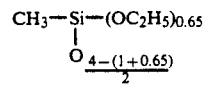

Octyltriethoxysilane (150 g) is added to the mixture.

A 6:4 mixture (by weight) of a triglyceride (25 g) with an HLB of 18 and an ethoxylated fatty alcohol with an HLB of 11 is dissolved in 225 g of water. The solution is stirred into the silane/siloxane mixture and converted into a stable emulsion with the homogenizer (slit homogenizer).

TESTING THE APPLICATION

The test pieces of lime sandstone with an edge length of 6 cm, which have been acclimatized for one week at a standard temperature and humidity (20° C./65% relative humidity) are immersed for 60 seconds in the emulsion, in which the concentration of active ingredient has been adjusted to 10%, and dried at standard temperature and humidity. The properties are tested one week after the impregnation.

1. Water Absorption

The water absorption is tested in the following manner. The impregnated and dried test pieces are kept for 24 hours under water. The height of the water above the test pieces is 5 cm. After the test pieces are taken out of the water, the water adhering to the outside is removed with filter paper. The test specimens are weighed once again. The water absorption is calculated according to the following formula:

water absorption (% by weight) = 100 (a−b)/b a = weight of the test specimen after immersion in water b = weight of the test specimen before immersion in water The depth of impregnation is determined as follows. The test specimens are split and the fragments are wetted with water. The hydrophobized, bright edge, which is not wetted, is measured. The following results are obtained:

| Emulsion of Example | Water-Repelling (Beading) | Depth (mm) of Impregnation | Water Absorption (% by Weight) |
|---|---|---|---|
| 1 | 1 | 3 | 2.1 |
| 2 | 2 | 2–3 | 2.0 |
| 3 | 1–2 | 2–3 | 2.4 |
| 4 | 1 | 3 | 2.2 |
| 5 | 1 | 3 | 2.1 |

2. Soiling

In order to test the soilability, the test pieces of lime sandstone with an edge length of 6 cm, which have been acclimatized for one week at a standard temperature and humidity (20° C./ 65% relative humidity) are immersed for 60 seconds in the emulsions of Examples 1, 4 and 5, which have been adjusted to 10% active ingredient, and dried at standard temperature and humidity for 1 week. After that, dry dust is applied on the flat upper side of the lime sandstone, so that the surfaces are completely covered The stones, so treated, are kept for 24 hours at 60° C. and for 24 hours at 80° in a drying oven. After that, they are removed from the oven and allowed to cool and the dust is removed with brushes. The amount of dust adhering is evaluated visually in comparison with a surface that has not been treated with dust.

The data in the column is the amount of dust adhering, expressed as a percentage.

| Examples | Kept for 24 Hrs. at 60° C. | Kept for 24 Hrs. at 80° C. |
|---|---|---|
| 1 | 10 | 30 |
| 4 | 0 | 10 |
| 5 | 0 | 0 |

We claim:
1. Preparation for the water-repellent impregnation of mineral building materials comprising a emulsion of
a) about between 5 to 45% by weight of an alkoxysilane of the general formula

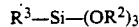

wherein
$R^1$ is an alkyl group with 1 to 16 carbon atoms and
$R^2$ is an alkyl group with 1 to 4 carbon atoms,
b) about between 45 to 5% by weight of a mixture of
b1) a silane of the general formula

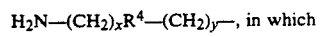

wherein
$R^2$ the above meaning and
$R^3$ is an aminoalkyl group with 1 to 6 carbon atoms or a group of th % general formula $H_2N-(CH_2)_x R^4-(CH_2)_y-$, in which $R^4$ represents oxygen, sulfur, —NH— or —NH—CH$_2$—CH$_2$—NH and
$x \geq 2$ and
$y \geq 2$, or a group of the general formula
$(R^2O)_3Si-(CH_2)_x-NH-(CH_2)_x-$, in which $R^2$ and x are defined as above,

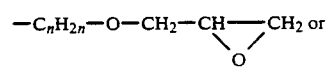

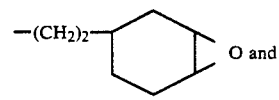

n is a whole number from 1 to 5, and
b2) a polysiloxane of the general formula

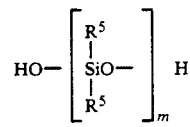

wherein
$R^5$ is a methyl or phenyl group, with the proviso that at least 90% of the $R^5$ groups are methyl group and
m = 20 to 250,
the ratio of b1) to b2) being such that more than 1 and up to 3 $OR^2$ groups of compound b1) correspond to one SiOH group of compound b2),
c) between about 0.5 to 10% by weight of an O/W emulsifier or emulsifier mixture and
d) about between 40 to 49.5% by weight of water.
2. The preparation of claim 1, wherein
$R^1$ is an alkyl group with 3 to 8 carbon atoms,
$R^2$ is a methyl or ethyl group,
$R^3$ is $H_2N-(CH_2)_3-$ or $H_2N-(CH_2)_3-NH-(CH_2)-$ or

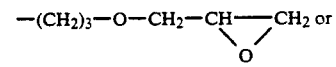

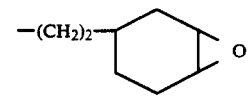

$R^5$ is a methyl group and the subscript m has a value of 30 to 80.
3. The preparation of claims 1 or 2, wherein the emulsion comprises about between 20 to 30% by weight of component a);
about between 30 to 20% by weight of component b1)+b2) in the ratio of 4:3 by weight;
about between 3 to 7% by weight of emulsifier; and
about between 47 to 43% by weight of water.

4. A method of rendering porous mineral building materials water repellent, which comprises impregnating the building material with an amount of the preparation of claim 1 sufficient to render the material water repellent.

5. A method of rendering porous mineral building materials water repellent, which comprises impregnating the building material with an amount of the preparation of claim 2 sufficient to render the material water repellent.

6. A method of rendering porous mineral building materials water repellent, which comprises impregnating the building material with an amount of the preparation of claim 3 sufficient to render the material water repellent.

7. Preparation for the water-repellant impregnation of mineral building materials comprising an emulsion of a) about between 5 to 45% by weight of an alkoxysilane of the general formula

$$R^1-Si-(OR^2)_3$$

wherein
$R^1$ is an alkyl group with 1 to 16 carbon atoms and
$R^2$ is an alkyl group with 1 to 4 carbon atoms, b) about between 45 to 5% by weight of a mixture of
b1) a silane of the general formula

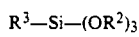

$$R^3-Si-(OR^2)_3$$

wherein
$R^2$ has the above meaning and
$R^3$ is an aminoalkyl group with 1 to 6 carbon atoms or a group of the general formula $$H_2N-(CH_2)_x R^4-(CH_2)_y-, \text{ in which}$$

$R^4$ represents oxygen, sulfur, —NH— or

—NH—CH$_2$—CH$_2$—NH— and $x = >2$ and
$y = <2$, or
a group of the general formula

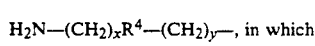

$$(R^2O)_3 Si-(CH_2)_x-NH-(CH_2)_x-,$$

in which $R^2$ and x are defined as above,

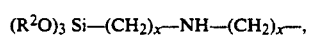

$$-C_nH_{2n}-O-CH_2-CH\underset{O}{\overset{}{\diagdown\!\!\diagup}}CH_2 \text{ or}$$

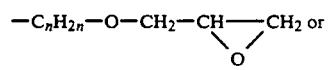

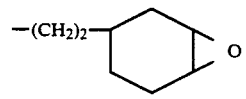

n is a whole number from 1 to 5, and
b2) a polysiloxane of the general formula

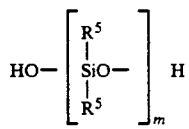

wherein
$R^5$ is a methyl or phenyl group, with the proviso that at least 90% of the $R^5$ groups are methyl group and
m = 20 to 250, the ratio of b1) to b2) being such that more than 1 and up to 3 $OR^2$ groups of compound b1) correspond to one SiOH group of compound B2), c) about between 0.5 to 10% by weight of an O/W emulsifier or emulsifier mixture, and d) about between 49.5 to 40% by weight of water, said components b1) and b2) being a reaction product obtained by reacting, partially or completely, components b1) and b2) by heating them to 150° to 200° C. before they are emulsified, in stoichiometric amounts.

8. Preparation for the water-repellant impregnation of mineral building materials comprising an emulsion of a) about between 5 to 45% by weight of an alkoxysilane of the general formula

$$R^1-Si-(OR^2)_3$$

wherein
$R^1$ is an alkyl group with 1 to 16 carbon atoms and
$R^2$ is an alkyl group with 1 to 4 carbon atoms, b) about between 45 to 5% by weight of a mixture of
b1) a silane of the general formula

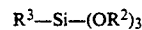

$$R^3-Si-(OR^2)_3$$

wherein
$R^3$ is an aminoalkyl group with 1 to 6 carbon atoms or a group of the general formula $$H_2N-(CH_2)_x R^4-(CH_2)_y-, \text{ in which}$$

$R^4$ represents oxygen, sulfur, —NH— or

—NH—CH$_2$—CH$_2$—NH— and $x = >2$ and $y = <2$, or
a group of the general formula

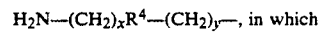

$$(R^2O)_3 Si-(CH_2)_x-NH-(CH_2)_x-,$$

in which $R^2$ and x are defined as above,

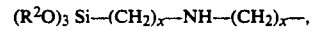

$$-C_nH_{2n}-O-CH_2-CH\underset{O}{\overset{}{\diagdown\!\!\diagup}}CH_2 \text{ or}$$

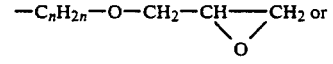

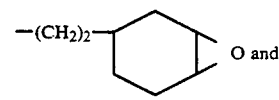

n is a whole number from 1 to 5, and
b2) a polysiloxane of the general formula

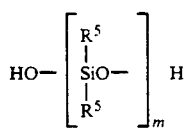

wherein
$R^5$ is a methyl or phenyl group, with the proviso that at least 90% of the $R^5$ groups are methyl group and
$m = 20$ to 250,
the ratio of b1) to b2) being such that more than 1 and up to 3 $OR^2$ groups of compound b1) correspond to one SiOH group of compound b2),
c) about between 0.5 to 10% by weight of an O/W emulsifier or emulsifier mixture, and
d) about between 49.5 to 40% by weight of water, and also up to 50% by weight of component b) being a siloxane of the general formula

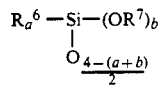

wherein
$R^6$ is an alkyl group with 1 to 8 carbon atoms or a phenyl group and
$R^7$ is an alkyl group with 1 to 4 carbon atoms,
$a = 0.8$ to 1.2 and
$b = 0.2$ to 1.2.

9. The preparation of claim 7, wherein
$R^1$ is an alkyl group with 3 to 8 carbon atoms,
$R^2$ is a methyl or ethyl group,
$R^3$ is $H_2N-(CH_2)_3-$ or $H_2N-(CH_2)_3-NH-(CH_2)-$ or

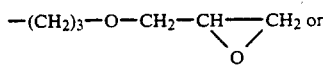

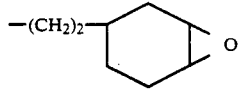

$R^5$ is a methyl group and the subscript m has a value of 30 to 80.

10. The preparation of claim 8, wherein
$R^1$ is an alkyl group with 3 to 8 carbon atoms,
$R^2$ is a methyl or ethyl group,
$R^3$ is $H_2N-(CH_2)_3-$ or $H_2N-(CH_2)_3-NH-(CH_2)-$ or

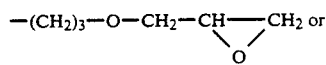

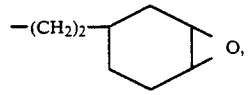

$R^5$ is a methyl group and the subscript m has a value of 30 to 80.

11. A method of rendering porous mineral building materials water repellent, which comprises inpregnating the building material with an amount of the preparation of claim 7 sufficient to render the material water repellent.

* * * * *